US011803520B2

(12) United States Patent
Tasaki

(10) Patent No.: US 11,803,520 B2
(45) Date of Patent: Oct. 31, 2023

(54) DATABASE GENERATION METHOD, DATABASE GENERATION DEVICE, NON-TRANSITORY COMPUTER-READABLE RECORDING MEDIUM RECORDING DATABASE GENERATION PROGRAM, DATA ANALYSIS METHOD, DATA ANALYZER, AND NON-TRANSITORY COMPUTER-READABLE RECORDING MEDIUM RECORDING DATA ANALYSIS PROGRAM

(71) Applicant: Panasonic Intellectual Property Corporation of America, Torrance, CA (US)

(72) Inventor: Nobuaki Tasaki, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 381 days.

(21) Appl. No.: 16/930,850

(22) Filed: Jul. 16, 2020

(65) Prior Publication Data

US 2021/0026815 A1    Jan. 28, 2021

(30) Foreign Application Priority Data

Jul. 26, 2019 (JP) .................................. 2019-137962

(51) Int. Cl.
*G06F 16/21* (2019.01)
*G06F 16/29* (2019.01)

(52) U.S. Cl.
CPC .............. *G06F 16/21* (2019.01); *G06F 16/29* (2019.01)

(58) Field of Classification Search
CPC ........ G06F 16/21; G06F 16/29; G06F 16/211; G06F 16/212
See application file for complete search history.

(56) References Cited

U.S. PATENT DOCUMENTS

2006/0149459 A1   7/2006  Matsuura et al.
2010/0082437 A1   4/2010  Tamayama et al.
(Continued)

FOREIGN PATENT DOCUMENTS

JP    2006-053132    2/2006
JP    2009-301078   12/2009
(Continued)

OTHER PUBLICATIONS

Extended European Search Report dated Feb. 8, 2021 issued in European Patent Application No. 20185068.2.

*Primary Examiner* — Dinku W Gebresenbet
*Assistant Examiner* — Dustin D Eyers
(74) *Attorney, Agent, or Firm* — Greenblum & Bernstein, P.L.C.

(57) ABSTRACT

Provided is a server device that acquires user attribute information indicating an attribute of a user boarding on a mobility that travels from a departure place to a destination in response to an instruction of the user, acquires location information indicating a location of the mobility during traveling, and generates a database in which a predetermined place existing between the departure place and the destination of the mobility, the predetermined place being specified based on the location information, is associated with the user attribute information.

9 Claims, 20 Drawing Sheets

(56) References Cited

U.S. PATENT DOCUMENTS

| | | | |
|---|---|---|---|
| 2012/0108261 A1 | 5/2012 | Miyake et al. | |
| 2013/0097012 A1* | 4/2013 | Ferber | G06Q 30/0277 |
| | | | 705/14.45 |
| 2013/0165156 A1* | 6/2013 | Liu | H04W 4/023 |
| | | | 455/456.3 |
| 2013/0321178 A1* | 12/2013 | Jameel | H04W 4/40 |
| | | | 340/989 |
| 2019/0230206 A1* | 7/2019 | Halash | H04W 8/24 |
| 2019/0340652 A1 | 11/2019 | Honda | |

FOREIGN PATENT DOCUMENTS

| | | |
|---|---|---|
| JP | 2011-038943 | 2/2011 |
| JP | 2012-142916 | 7/2012 |
| JP | 2015-076079 | 4/2015 |
| JP | 2018-081054 | 5/2018 |
| JP | 2019-020928 | 2/2019 |
| WO | 2018/021506 | 1/2018 |

\* cited by examiner

FIG.6

| USER ID | NAME | GENDER | AGE (BIRTH DATE) | OCCUPATION |
|---------|------|--------|------------------|------------|
| 00001   |      |        |                  |            |
| 00002   |      |        |                  |            |
| 00003   |      |        |                  |            |

FIG.7

| RESERVATION ID | USER ID | RESERVATION START DATE AND TIME | RESERVATION END DATE AND TIME | DEPARTURE PLACE (AREA ID) | DESTINATION (AREA ID) | TYPE OF MOBILITY | MOBILITY ID | ADVERTISEMENT ID | PASSWORD |
|---|---|---|---|---|---|---|---|---|---|
| 100001 | 0001 | 19/2/16 13:30 | 19/2/16 15:30 | | | 00001 | | | |
| 100002 | 0002 | 19/2/18 15:00 | 19/2/18 17:00 | | | 00003 | | | |
| 100003 | 0003 | 19/2/19 16:00 | 19/2/19 17:00 | | | 00001 | | | |

FIG.8

| LINK ID | PASSAGE DATE AND TIME | RESERVATION ID |
|---|---|---|
| 121021 | 19/2/16 13:30 | 100001 |
| 121021 | 19/2/18 15:00 | 100002 |
| 443456 | 19/2/19 16:00 | 100003 |

FIG.9

| LINK ID | COORDINATE OF END POINT | DISTANCE (m) |
|---------|-------------------------|--------------|
| 121021  |                         |              |
| 121022  |                         |              |
| 121023  |                         |              |

FIG.13

| AREA ID | STOP DATE AND TIME | RESERVATION ID |
|---|---|---|
| A[2,2] | 19/2/16 13:30 | 100001 |
| A[1,3] | 19/2/18 15:00 | 100002 |
| A[2,4] | 19/2/19 16:00 | 100003 |

FIG.14

| AREA ID | CENTER COORDINATE |
|---------|-------------------|
| A[1,1]  |                   |
| A[1,2]  |                   |
| A[1,3]  |                   |

FIG.17

| RANK | AREA ID | FIRST PROBABILITY |
|---|---|---|
| 1 | A[1,3] | 20% |
| 2 | A[2,3] | 15% |
| 3 | A[4,3] | 10% |

FIG.18

| RANK | AREA ID | SECOND PROBABILITY |
|---|---|---|
| 1 | A[2,3] | 30% |
| 2 | A[1,3] | 25% |
| 3 | A[4,3] | 20% |

FIG.19

| RANK | AREA ID | DIFFERENCE VALUE |
|------|---------|------------------|
| 1 | A[2,3] | 15% |
| 2 | A[4,3] | 10% |
| 3 | A[1,3] | 5% |

FIG.21

| RANK | DESTINATION | AREA ID |
|---|---|---|
| 1 | ZZZ UNIVERSITY | A[1,3] |
| 2 | ZZZ LIBRARY | A[2,3] |
| 3 | SHOPPING CENTER | A[4,3] |
| 4 | CONVENIENCE STORE | A[4,6] |

FIG.22

| RANK | LINK ID | PASSAGE AMOUNT |
|---|---|---|
| 1 | 121021 | 120/DAY |
| 2 | 332000 | 60/DAY |
| 3 | 443456 | 30/DAY |
| 4 | 777377 | 10/DAY |

FIG.23

| RANK | STOPOVER | AREA ID |
|---|---|---|
| 1 | RESTAURANT AAA | A[1,3] |
| 2 | RESTAURANT BBB | A[2,3] |
| 3 | RESTAURANT CCC | A[4,3] |
| 4 | CAFE DDD | A[5,6] |

DATABASE GENERATION METHOD, DATABASE GENERATION DEVICE, NON-TRANSITORY COMPUTER-READABLE RECORDING MEDIUM RECORDING DATABASE GENERATION PROGRAM, DATA ANALYSIS METHOD, DATA ANALYZER, AND NON-TRANSITORY COMPUTER-READABLE RECORDING MEDIUM RECORDING DATA ANALYSIS PROGRAM

FIELD OF THE INVENTION

The present disclosure relates to a technique for generating a database and a technique for extracting predetermined data satisfying an extraction condition from the database.

BACKGROUND ART

In recent years, development in automatic driving systems and mobility as a service (MaaS) requires more detailed and accurate usage status of mobility to be collected.

For example, Japanese Unexamined Patent Publication No. 2012-142916 discloses a method for estimating a mobile behavior in a mobile network, the method including: receiving event data indicating a location of a user device, preprocessing the received event data to generate preprocessed data; performing a straight line interpolation on the preprocessed data on one or more individuals of population to estimate an intermediate location of a trajectory from a first location to a second location of each of the one or more individuals; and counting individuals in population at a given time and in a given area.

In addition, for example, Japanese Unexamined Patent Publication No. 2009-301078 discloses a vehicle operation system, including processes of: extracting concentrated demand for combination of a concentrated demand time zone with a high demand, and a concentrated demand section between stops, with a high demand for vehicle use, based on usage record information; creating a concentrated demand response operation plan corresponding to the concentrated demand based on the extracted result; capturing the concentrated demand response operation plan as it is and updating the current operation plan in response to new use request information on buses, including a getting on and off place, the number of passengers, and a desired time of boarding, to create an optimized new operation plan; extracting a getting on and off place for each vehicle in the order of operation time based on the new operation plan; and transmitting the getting on and off place to a vehicle-mounted device of a corresponding vehicle.

Further, for example, Japanese Unexamined Patent Publication No. 2019-20928 discloses a service providing server that performs processes of: obtaining probe information on a vehicle and accumulating the information in a storage device; and generating traffic information between two consecutive stops included in a travel plan of the vehicle based on the accumulated probe information.

Unfortunately, it is difficult for the above conventional techniques to collect a usage status of a mobility movable along an arbitrary route from a departure place to a destination in more detail and with high accuracy, and thus further improvement therein is required.

SUMMARY OF THE INVENTION

The present disclosure is made to solve the above problem, and an object thereof is to provide a technique capable of collecting a usage status of a mobility movable along an arbitrary route from a departure place to a destination in more detail and with high accuracy.

A database generation method according to an aspect of the present disclosure is used in a database generation device that generates a database, and includes: acquiring user attribute information indicating attributes of a user boarding a mobility that travels from a departure place to a destination in response to an instruction of the user; acquiring location information indicating a location of the mobility during traveling; and generating a database in which a predetermined place existing between the departure place and the destination of the mobility, the predetermined place being specified based on the location information, is associated with the user attribute information.

BRIEF DESCRIPTION OF THE DRAWINGS

FIG. 6 is a diagram showing an example of user attribute information stored in a user attribute information storage unit in the present embodiment;

FIG. 7 is a diagram showing an example of reservation information stored in a reservation information storage unit in the present embodiment;

FIG. 8 is a diagram showing an example of a link ID database according to the present embodiment;

FIG. 9 is a diagram showing an example of link information according to the present embodiment;

FIG. 13 is a diagram showing an example of an area ID database according to the present embodiment;

FIG. 14 is a diagram showing an example of area information according to the present embodiment;

FIG. 17 is a diagram showing an example of a first probability of stopping in an area of an extracted area ID when an advertisement for promoting a stopover in the area is not distributed in the present embodiment;

FIG. 18 is a diagram showing an example of a second probability of stopping in an area of an extracted area ID when an advertisement for promoting a stopover in the area is distributed in the present embodiment;

FIG. 19 is a diagram showing an example of a difference value between the first probability and the second probability in the present embodiment;

FIG. 21 is a diagram showing an example of an analysis result in which destinations extracted based on a predetermined extraction condition are ranked and listed in the present embodiment;

FIG. 22 is a diagram showing an example of an analysis result in which link passage amounts extracted based on a predetermined extraction condition are ranked and listed in the present embodiment; and FIG. 23 is a diagram showing an example of an analysis result in which stopovers extracted based on a predetermined extraction condition are ranked and listed in the present embodiment.

Figure 1:
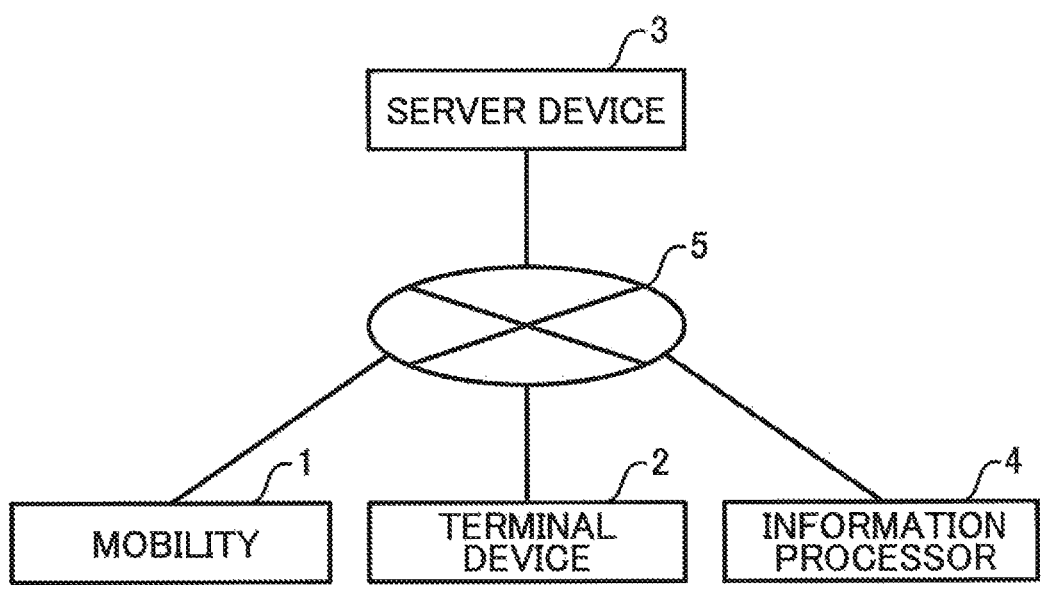
FIG. 1 is a diagram illustrating a general configuration of a mobility management system according to an embodiment of the present disclosure.

DESCRIPTION OF EMBODIMENTS (Underlying Knowledge of the Present Disclosure)

The method disclosed in Japanese Unexamined Patent Publication No. 2012-142916 is configured to receive event data indicating a location of a user device instead of a location of a mobility. Thus, a user using public transportation travels on a predetermined route, so that the user cannot travel any route from a departure place to a destination. This causes a usage status of a mobility to be difficult to be collected.

In addition, the vehicle operation system disclosed in Japanese Unexamined Patent Publication No. 2009-301078 creates an operation plan for public transportation such as a bus. Public transportation requires a user to go through predetermined getting on and off places, so that the user cannot travel any route from a departure place to a destination. This causes a usage status of a mobility to be difficult to be collected with high accuracy.

Further, the service providing server disclosed in Japanese Unexamined Patent Publication No. 2019-20928 generates traffic information between two consecutive stops included in a travel plan of a vehicle based on probe information on the vehicle. Unfortunately, the traffic information is a travel time between the two consecutive stops, so that collecting a usage status of a mobility with high accuracy is difficult.

To solve the above problems, a database generation method according to an aspect of the present disclosure is used in a database generation device that generates a database, and includes: acquiring user attribute information indicating attributes of a user boarding a mobility that travels from a departure place to a destination in response to an instruction of the user; acquiring location information indicating a location of the mobility during traveling; and generating a database in which a predetermined place existing between the departure place and the destination of the mobility, the predetermined place being specified based on the location information, is associated with the user attribute information.

According to this configuration, the database is generated in which the predetermined place existing between the departure place and the destination of the mobility, the predetermined place being specified based on the location information indicating a location of the mobility that travels from the departure place to the destination in response to the instruction of the user, is associated with the user attribute information indicating the attributes of the user boarding the mobility. This enables collecting a usage status of the mobility movable along an arbitrary route from the departure place to the destination in more detail and with high accuracy.

In addition, in the above database generation method, the predetermined place may include a road through which the mobility passes, and the database may include road identification information for identifying the road specified based on the location information, a date and time of passage through the road, and the user attribute information, the road identification information, the date and time, and the user attribute information being associated with each other.

According to this configuration, the database is generated in which the road identification information for identifying the road specified based on the location information, the date and time of passage through the road, and the user attribute information are associated with each other. This enables collecting a usage status of the road through which the mobility passes, the road being used by the user, with higher accuracy.

Further, in the above database generation method, the predetermined place may include a stop place where the mobility stops before reaching the destination, and the database may include stop place identification information for identifying the stop place at which the mobility has stopped, a date and time at which the mobility has stopped at the stop place, and the user attribute information, the stop place identification information, the date and time, and the user attribute information being associated with each other, when it is determined whether the mobility has stopped at the stop place before reaching the destination and it is determined that the mobility has stopped at the stop place before reaching the destination.

According to this configuration, the database is generated in which the stop place identification information for identifying the stop place at which the mobility has stopped before reaching the destination, the date and time at which the mobility has stopped at the stop place, and the user attribute information are associated with each other. This enables collecting a place at which the mobility, that is, the user has stopped, with higher accuracy.

Further, in the above database generation method, the determination may be made as to whether the mobility has stopped at the stop place before reaching the destination based on whether the mobility has stopped for a predetermined time or more based on the location information.

According to this configuration, when the mobility has stopped for the predetermined time or more before reaching the destination, it can be determined that the mobility has stopped at the stop place before reaching the destination. This enables collecting a place where the mobility has stopped for the predetermined time or more as the stop place where the mobility has stopped.

Further, in the above database generation method, the determination may be made as to whether the mobility has stopped at the stop place before reaching the destination based on whether the mobility has been locked before reaching the destination.

According to this configuration, when the mobility has been locked before reaching the destination, it can be determined that the mobility has stopped at the stop place before reaching the destination. This enables collecting a place where the mobility has been locked as the stop place where the mobility has stopped.

Further, in the above database generation method, the determination may be made as to whether the mobility has stopped at the stop place before reaching the destination based on whether power-off operation or engine stop operation has been performed on the mobility before the mobility reaches the destination.

According to this configuration, when the power-off operation or the engine stop operation has been performed on the mobility before the mobility reaches the destination, it can be determined that the mobility has stopped at the stop place before reaching the destination. This enables collecting a place where the power-off operation or the engine stop operation is performed on the mobility as the stop place where the mobility has stopped.

In the above database generation method, the stop place identification information may include area identification information for identifying an area including the stop place selected from among a plurality of areas obtained by dividing map information.

According to this configuration, the stop place where the mobility has stopped for a predetermined time or more is managed in units of a plurality of areas obtained by dividing the map information. Thus, even when the location information has a low accuracy, the place where the user has stopped can be specified.

Further, the above database generation method may further include: acquiring reservation information including the departure place and the destination input by the user; predicting a traveling route from the departure place to the destination; extracting the stop place existing near the traveling route from the database; calculating a first probability of stopping at the stop place extracted when an advertisement for promoting the stop place extracted is not distributed, and a second probability of stopping at the stop place when the advertisement is distributed; calculating a difference value between the first probability and the second probability; and transmitting the advertisement based on the difference value.

According to this configuration, the difference value between the first probability of stopping at the stop place when the advertisement is not distributed and the second probability of stopping at the stop place when the advertisement is distributed indicates how many people will stop at the stop place by distributing the advertisement. This enables transmitting an advertisement of a stop place where an advertising effect increases.

In the above database generation method, the stop place may include a plurality of the stop places, and an advertisement of a stop place having a maximum difference value among the plurality of stop places may be transmitted.

According to this configuration, the advertisement of the stop place having the maximum difference value among the plurality of stop places is transmitted, so that the advertisement of the stop place having a maximum advertising effect can be transmitted.

A database generation device according to another aspect of the present disclosure includes: a user attribute information acquisition unit that acquires user attribute information indicating attributes of a user boarding a mobility that travels from a departure place to a destination in response to an instruction of the user; a location information acquisition unit that acquires location information indicating a location of the mobility during traveling; and a generation unit that generates a database in which a predetermined place existing between the departure place and the destination of the mobility, the predetermined place being specified based on the location information, is associated with the user attribute information.

According to this configuration, the database is generated in which the predetermined place existing between the departure place and the destination of the mobility, the predetermined place being specified based on the location information indicating a location of the mobility that travels from the departure place to the destination in response to the instruction of the user, is associated with the user attribute information indicating the attributes of the user boarding the mobility. This enables collecting a usage status of the mobility movable along an arbitrary route from the departure place to the destination in more detail and with high accuracy.

A non-transitory computer-readable recording medium recording a database generation program according to another aspect of the present disclosure is configured to cause a computer to execute the steps of: acquiring user attribute information indicating attributes of a user boarding a mobility that travels from a departure place to a destination in response to an instruction of the user; acquiring location information indicating a location of the mobility during traveling; and generating a database in which a predetermined place existing between the departure place and the destination of the mobility, the predetermined place being specified based on the location information, is associated with the user attribute information.

According to this configuration, the database is generated in which the predetermined place existing between the departure place and the destination of the mobility, the predetermined place being specified based on the location information indicating a location of the mobility that travels from the departure place to the destination in response to the instruction of the user, is associated with the user attribute information indicating the attributes of the user boarding the mobility. This enables collecting a usage status of the mobility movable along an arbitrary route from the departure place to the destination in more detail and with high accuracy.

A data analysis method according to another aspect of the present disclosure is used in a data analyzer that extracts the predetermined place satisfying an extraction condition from the database generated by the database generation method, the data analysis method including: acquiring the extraction condition; extracting the predetermined place satisfying the extraction condition from the database; and outputting analysis result information including the predetermined place extracted.

According to this configuration, a predetermined place satisfying the extraction condition is extracted from a database in which a predetermined place existing between a departure place and a destination of a mobility is associated with user attribute information indicating attributes of a user boarding the mobility, and analysis result information including the extracted predetermined place is output. Thus, when an operator inputs a desired extraction condition, a predetermined place satisfying the desired extraction condition is obtained. This enables the database to be used for data analysis.

In the above data analysis method, the predetermined place may include a road through which the mobility has passed, the database may include road identification information for identifying the road, a date and time at which the mobility has passed through the road, the user attribute information, and a type of the mobility, the road identification information, the date and time, the user attribute information, and the type of the mobility being associated with each other, the extraction condition may include the following: an occupation, an age, and a gender included in the user attribute information, the occupation, the age, and the gender being selected from all types of occupation, all types of age, and all types of gender; the date and time of passing through the road that is within a specific time period; and the type of the mobility that is a specific type, a plurality of roads satisfying the extraction condition may be extracted from the database, a number of passes may be totaled for each of the plurality of roads extracted, and the analysis result information on a predetermined number of roads in order from a road with a maximum total number, including the road, may be output.

According to this configuration, roads satisfying the extraction condition are specified, and the specified roads are output in descending order of the number of passes. This enables a road with many users, for example, to be specified when a bus stop is installed.

In the above data analysis method, the predetermined place may include a stop place where the mobility has stopped for a predetermined time or more, the database may include stop place identification information for identifying the stop place, a date and time at which the mobility has stopped at the stop place, the user attribute information, a type of the mobility, the stop place identification information, the date and time, the user attribute information, and the type of the mobility being associated with each other, the extraction condition may include the following: an occupation included in the user attribute information, the occupation being a specific occupation; a date and time at which the mobility has stopped at the stop place, the date and time being a specific time zone; and a type of the mobility, the type of the mobility being a specific type, a plurality of stop places satisfying the extraction condition may be extracted from the database, a number of stops may be totaled for each of the plurality of stop places extracted, and the analysis result information on a predetermined number of stop places in order from a stop place with a maximum total number, including the stop place, may be output.

According to this configuration, stop places satisfying the extraction condition are specified, and the specified stop places are output in descending order of the number of stops. This enables specifying, for example, a place used by a person of a specific occupation in a specific time zone.

A data analyzer according to another aspect of the present disclosure extracts the predetermined place satisfying an extraction condition from the database generated by the above database generation method, and includes an extraction condition acquisition unit that acquires the extraction condition, an extraction unit that extracts the predetermined place satisfying the extraction condition from the database, and an output unit that outputs analysis result information including the predetermined place extracted.

According to this configuration, a predetermined place satisfying the extraction condition is extracted from a database in which a predetermined place existing between a departure place and a destination of a mobility is associated with user attribute information indicating attributes of a user boarding the mobility, and analysis result information including the extracted predetermined place is output. Thus, when an operator inputs a desired extraction condition, a predetermined place satisfying the desired extraction condition is obtained. This enables the database to be used for data analysis.

Anon-transitory computer-readable recording medium according to another aspect of the present disclosure records a data analysis program for extracting the predetermined place satisfying an extraction condition from the database generated by the database generation method, and is configured to cause a computer to execute the steps of: acquiring the extraction condition; extracting the predetermined place satisfying the extraction condition from the database; and outputting analysis result information including the predetermined place extracted.

According to this configuration, a predetermined place satisfying the extraction condition is extracted from a database in which a predetermined place existing between a departure place and a destination of a mobility is associated with user attribute information indicating attributes of a user boarding the mobility, and analysis result information including the extracted predetermined place is output. Thus, when an operator inputs a desired extraction condition, a predetermined place satisfying the desired extraction condition is obtained. This enables the database to be used for data analysis.

Hereinafter, embodiments of the present disclosure will be described with reference to the accompanying drawings. The following embodiments are merely examples embodying the present disclosure, and do not limit the technical scope of the present disclosure.

EMBODIMENTS

FIG. 1 is a diagram illustrating a general configuration of a mobility management system according to an embodiment of the present disclosure.

The mobility management system shown in FIG. 1 includes a mobility 1, a terminal device 2, a server device 3, and an information processor 4.

The mobility 1 is, for example, an electric vehicle, an electric motorcycle, or an electric bicycle, and is usable by an individual taking sole possession of the mobility 1 during traveling. The mobility 1 is driven by a user. The mobility 1 travels from a departure place to a destination according to a user's instruction. The mobility 1 can be rented anywhere and returned anywhere. The mobility 1 allows the user to stop by anywhere. The mobility 1 is communicatively connected to the server device 3 via a network 5. The network 5 is, for example, the Internet.

The mobility 1 is not limited to an electric vehicle or an electric motorcycle, and may be an automobile or a motorcycle, equipped with an internal combustion engine. In addition, the mobility 1 may be an automatic driving vehicle as long as the user can arbitrarily determine a traveling route and can get on and off anywhere.

The terminal device 2 is, for example, a smartphone, a tablet computer, or a personal computer, and is used by the user boarding the mobility 1. The terminal device 2 receives a user's input of reservation information for reserving use of the mobility 1. The reservation information includes, for example, a user ID for identifying the user, a departure place, a destination, a reservation start date and time, a reservation end date and time, and a type of mobility. The terminal device 2 is communicatively connected to the server device 3 via the network 5.

The mobility 1 is distributed to the departure place by the reservation start date and time. When the mobility 1 is an electric motorcycle or an electric bicycle, for example, a truck carries the mobility 1 to a departure place and collects the mobility 1 at a destination. When the mobility 1 is an electric vehicle or an electric motorcycle, a driver may drive the mobility 1 and deliver the mobility 1 to a departure place by a reservation start date and time. The mobility 1 also may travel to a departure place by a reservation start date and time with automatic driving.

The server device 3 is, for example, a Web server. The server device 3 is an example of a database generation device and a data analyzer. The server device 3 receives various types of information from the mobility 1, the terminal device 2, and the information processor 4, and transmits various types of information to the mobility 1, the terminal device 2, and the information processor 4. The server device 3 generates a database indicating a usage status of the mobility 1 based on information received from the mobility 1. The server device 3 also receives an extraction condition from the information processor 4, extracts data satisfying the received extraction condition from the database, and transmits the extracted data to the information processor 4 as analysis result information.

The information processor 4 is, for example, a personal computer. The information processor 4 transmits the extraction condition to the server device 3, receives the analysis result information from the server device 3, and presents the received analysis result information.

Figure 2:
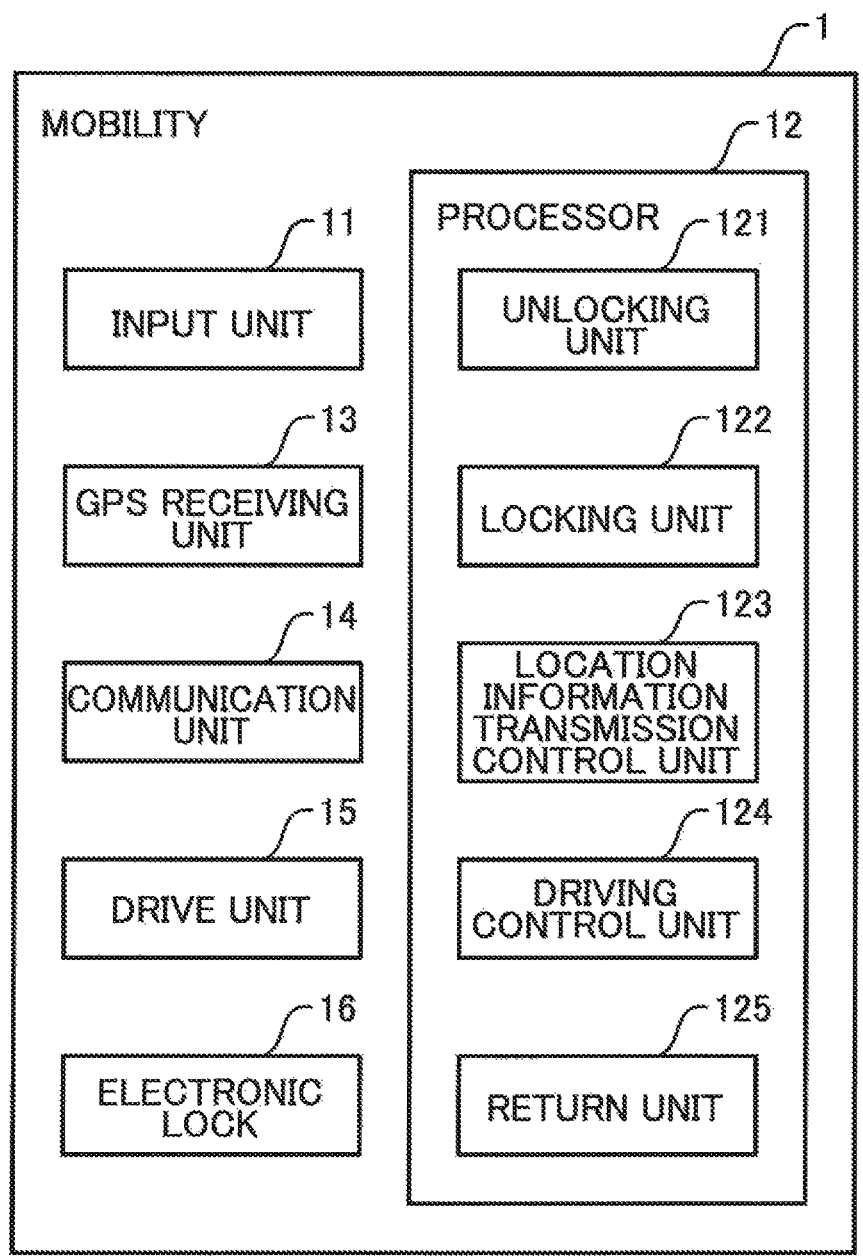
FIG. 2 is a diagram illustrating an example of a mobility configuration according to an embodiment of the present disclosure.

FIG. 2 is a diagram illustrating an example of a mobility configuration according to an embodiment of the present disclosure.

The mobility 1 shown in FIG. 2 includes an input unit 11, a processor 12, a global positioning system (GPS) receiving unit 13, a communication unit 14, a drive unit 15, and an electronic lock 16.

The input unit 11 receives a driving operation of the mobility 1, performed by the user. The input unit 11 also receives an unlocking operation, a locking operation, and a returning operation of the mobility 1, performed by the user. For example, the input unit 11 includes a numeric keypad, an unlock button, a lock button, and a return button. The numeric keypad receives input of a password for unlocking the mobility 1. The unlock button receives an unlocking operation of the mobility 1, performed by the user after a password is input. The lock button receives a locking operation of the mobility 1, performed by the user. The return button receives a returning operation of the mobility 1, performed by the user after locking.

The locking operation and the unlocking operation of the mobility 1 may be performed using a two-dimensional barcode, an IC card reader, or the like.

The GPS receiving unit 13 acquires a current location of the mobility 1. The current location is represented by latitude and longitude.

The electronic lock 16 is electrically locked and unlocked.

The processor 12 is, for example, a central processing unit (CPU) and includes an unlocking unit 121, a locking unit 122, a location information transmission control unit 123, a driving control unit 124, and a return unit 125.

When the user inputs a password and presses the unlock button, the unlocking unit 121 transmits the input password and a mobility ID for identifying the mobility 1 to the server device 3 via the communication unit 14. When the communication unit 14 receives an unlock signal, the unlocking unit 121 unlocks the electronic lock 16 of the mobility 1.

When the user presses the lock button, the locking unit 122 locks the electronic lock 16 of the mobility 1.

The location information transmission control unit 123 transmits location information indicating a location of the mobility 1 received by the GPS receiving unit 13 to the server device 3 via the communication unit 14. The location information transmission control unit 123 periodically transmits the location information to the server device 3.

The driving control unit 124 controls the drive unit 15 according to a driving operation of the input unit 11, performed by the user to cause the mobility 1 to travel.

When the user presses the return button, the return unit 125 transmits a return signal, indicating that driving of the mobility 1 is terminated to return the mobility 1, to the server device 3 via the communication unit 14. The electronic lock 16 of the mobility 1 is not unlocked unless a new password is issued after the return signal is transmitted.

The communication unit 14 transmits various types of information to the server device 3 and receives various types of information from the server device 3. The communication unit 14 transmits a password and a mobility ID to the server device 3. The communication unit 14 receives an unlock signal transmitted by the server device 3. The communication unit 14 transmits location information to the server device 3. The communication unit 14 also transmits the return signal to the server device 3.

The drive unit 15 is, for example, a traveling motor and a transmission, and travels the mobility 1 under control of the driving control unit 124.

Figure 3:
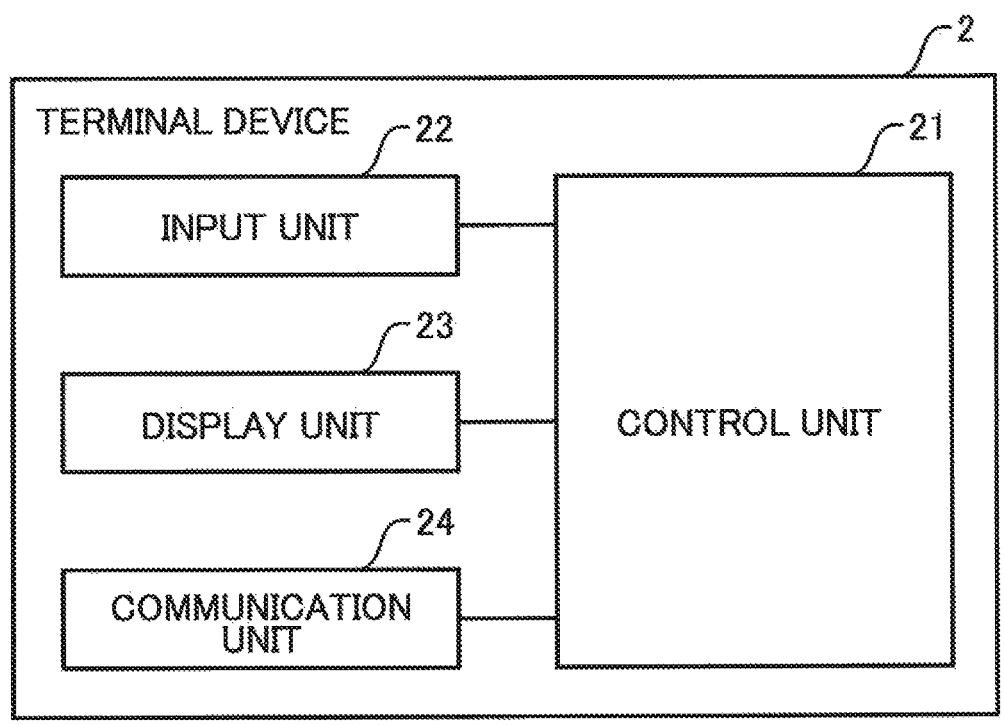
FIG. 3 is a diagram illustrating an example of a configuration of a terminal device according to an embodiment of the present disclosure.

FIG. 3 is a diagram illustrating an example of a configuration of a terminal device according to an embodiment of the present disclosure.

The terminal device 2 shown in FIG. 3 includes a control unit 21, an input unit 22, a display unit 23, and a communication unit 24.

The control unit 21 is, for example, a CPU and controls the entire terminal device 2.

The input unit 22 is, for example, a touch panel, and receives various types of information input by the user. The input unit 22 receives user attribute information input by the user. The user attribute information includes a user ID for identifying the user, a name of the user, a gender of the user, an age (birth date) of the user, and an occupation of the user. The input unit 22 also receives reservation information input by the user.

The communication unit 24 transmits various types of information to the server device 3 and receives various types of information from the server device 3. The communication unit 24 transmits the user attribute information input using the input unit 22 to the server device 3. The communication unit 24 also transmits the reservation information input using the input unit 22 to the server device 3. In addition, the communication unit 24 receives advertisement information transmitted by the server device 3. The communication unit 24 also receives a password for unlocking the electronic lock 16 of the mobility 1 from the server device 3.

The display unit 23 is, for example, a liquid crystal display device and displays various types of information. The display unit 23 displays a display screen for receiving an input of the user attribute information. The display unit 23 also displays a display screen for receiving an input of the reservation information. In addition, the display unit 23 displays the advertisement information received by the communication unit 24. The display unit 23 further displays the password received by the communication unit 24.

Here, a traveling route of the mobility 1 will be described.

Figure 4:
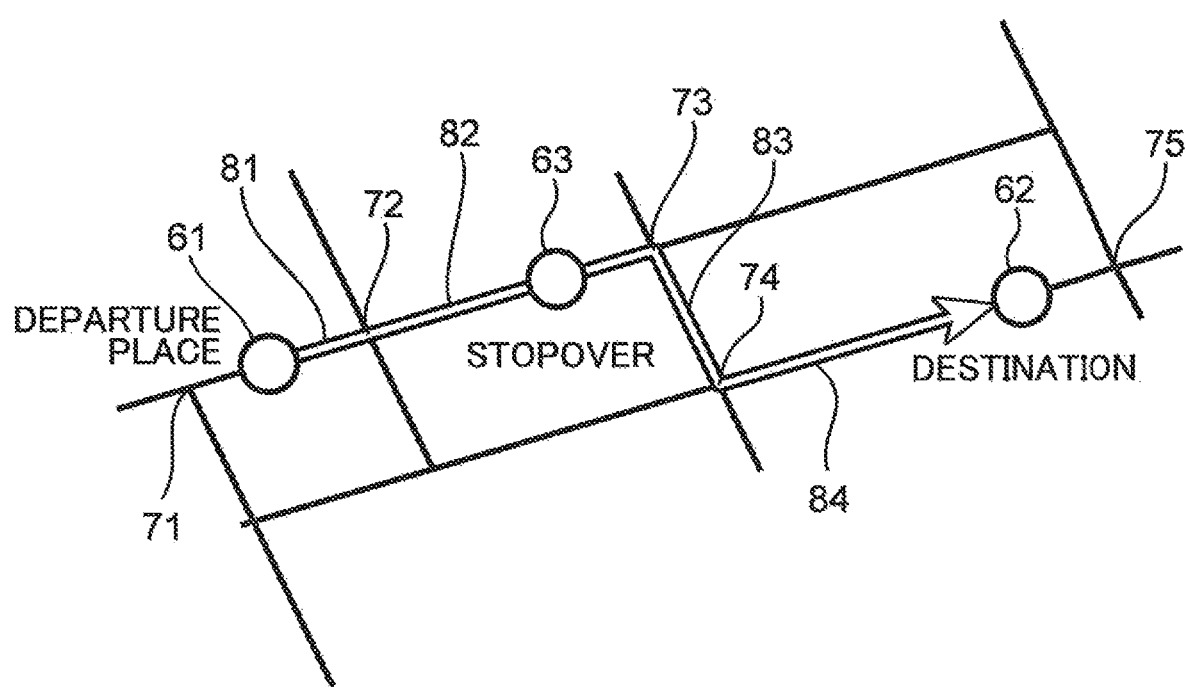
FIG. 4 is a schematic diagram for illustrating a traveling route of a mobility according to the present embodiment.

FIG. 4 is a schematic diagram for illustrating a traveling route of a mobility according to the present embodiment.

As shown in FIG. 4, the mobility 1 travels from a departure place 61 to a destination 62. Between the departure place 61 and the destination 62, there is a stopover 63 where the mobility 1 stops for a predetermined time or more. In addition, an intersection is also called a node, and a road between two nodes is also called a link. In FIG. 4, a link 81 connects a node 71 and a node 72, a link 82 connects the node 72 and a node 73, a link 83 connects the node 73 and a node 74, and a link 84 connects the node 74 and a node 75. The departure place 61 is located on the link 81, the destination 62 is located on the link 84, and the stopover 63 is located on the link 82. Each link is assigned with a link ID for identifying the link. The mobility 1 passes through the links 81, 82, 83, 84 while traveling from the departure place 61 to the destination 62.

Figure 5:
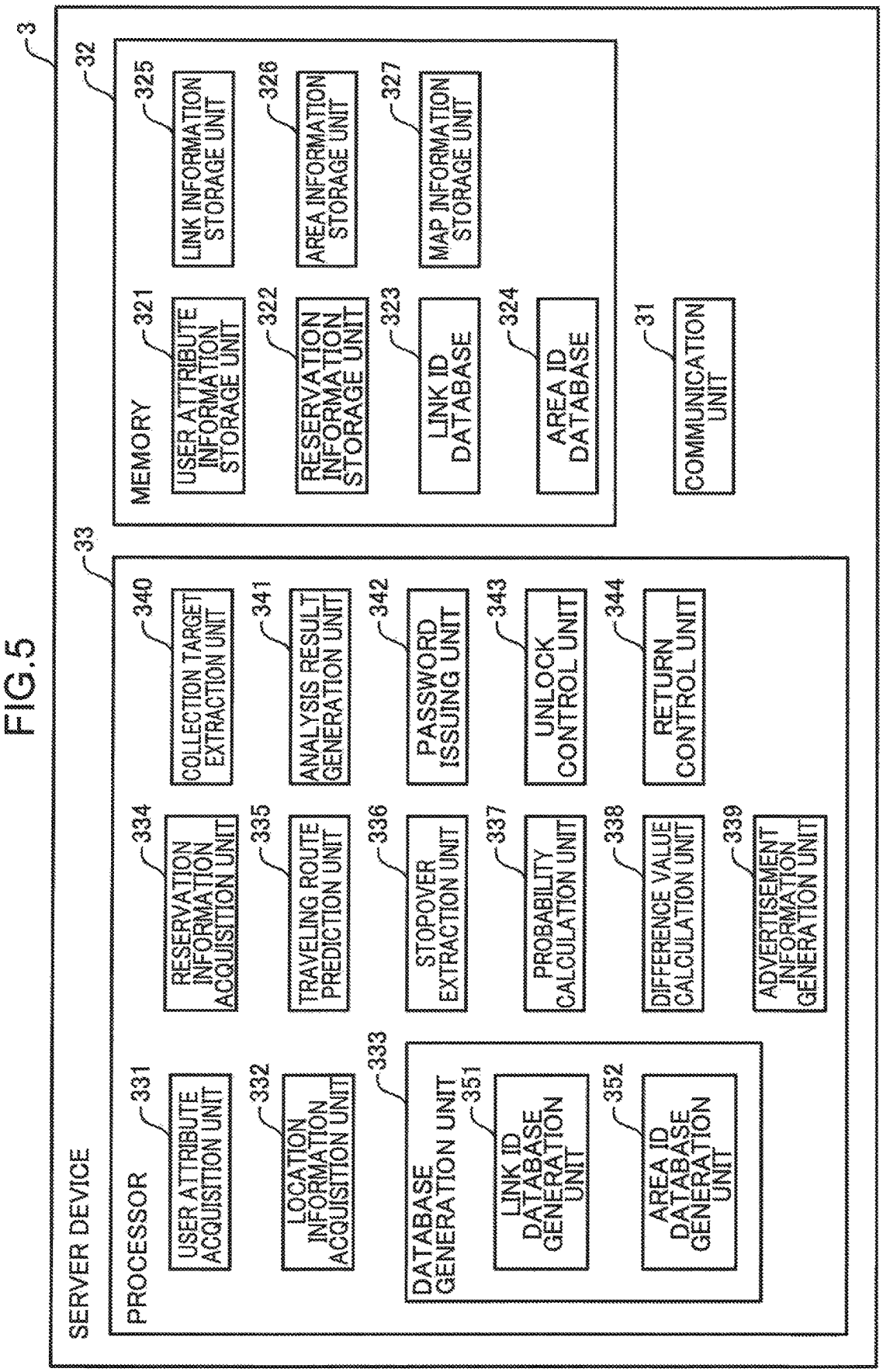
FIG. 5 is a diagram illustrating an example of a configuration of a server device according to an embodiment of the present disclosure.

FIG. 5 is a diagram illustrating an example of a configuration of a server device according to an embodiment of the present disclosure.

The server device 3 shown in FIG. 5 includes a communication unit 31, a memory 32, and a processor 33.

The communication unit 31 receives the user attribute information transmitted by the terminal device 2. The communication unit 31 stores the received user attribute information in a user attribute information storage unit 321. In addition, the communication unit 31 receives the reservation information transmitted by the terminal device 2. The communication unit 31 stores the received reservation information in a reservation information storage unit 322. The communication unit 31 transmits the advertisement information to the terminal device 2.

The communication unit 31 also transmits the password for unlocking the electronic lock 16 of the mobility 1 to the terminal device 2. The communication unit 31 receives the password and the mobility ID transmitted by the mobility 1. The communication unit 31 transmits the unlock signal to the mobility 1. The communication unit 31 receives the return signal transmitted by the mobility 1.

The communication unit 31 also receives the location information transmitted by the mobility 1. The communication unit 31 outputs the received location information to a location information acquisition unit 332.

In addition, the communication unit 31 receives the extraction condition transmitted by the information processor 4. The communication unit 31 transmits the analysis result information to the information processor 4.

The memory 32 is, for example, a semiconductor memory or a hard disk drive, and includes the user attribute information storage unit 321, the reservation information storage unit 322, a link ID database 323, an area ID database 324, a link information storage unit 325, an area information storage unit 326, and a map information storage unit 327.

The processor 33 is, for example, a CPU, and includes a user attribute acquisition unit 331, the location information acquisition unit 332, a database generation unit 333, a reservation information acquisition unit 334, a traveling route prediction unit 335, a stopover extraction unit 336, a probability calculation unit 337, a difference value calculation unit 338, an advertisement information generation unit 339, a collection target extraction unit 340, an analysis result generation unit 341, a password issuing unit 342, an unlock control unit 343, and a return control unit 344.

The user attribute information storage unit 321 stores the user attribute information.

FIG. 6 is a diagram showing an example of the user attribute information stored in the user attribute information storage unit in the present embodiment.

As shown in FIG. 6, the user attribute information includes a user ID for identifying the user, a name of the user, a gender of the user, an age of the user, and an occupation of the user. The age of the user may be a birth date of the user. The user attribute information is preliminarily registered by the user.

The reservation information storage unit 322 stores the reservation information.

FIG. 7 is a diagram showing an example of the reservation information stored in the reservation information storage unit in the present embodiment.

As shown in FIG. 7, the reservation information includes a reservation ID for identifying the reservation, a user ID, a reservation start date and time, a reservation end date and time, a departure place, a destination, and a type of mobility reserved by the user, a mobility ID for identifying the mobility, an advertisement ID for identifying an advertisement presented to the user at the time of reservation, and a password for unlocking the electronic lock 16 of the mobility 1. The type of mobility indicates, for example, any one of an electric bicycle, an electric motorcycle, and an electric vehicle. When receiving the reservation information from the terminal device 2, the communication unit 31 assigns the reservation ID to the received reservation information. Then, the communication unit 31 adds a record including the reservation information with the reservation ID assigned to a table of the reservation information storage unit 322. The departure place and the destination are each represented by an area ID. The area ID will be described later.

The user attribute acquisition unit 331 acquires the user attribute information indicating attributes of the user boarding the mobility 1 traveling from the departure place to the destination according to the user's instruction.

The location information acquisition unit 332 acquires the location information indicating a location of the mobility 1 during traveling.

The database generation unit 333 generates a database in which a predetermined place specified based on the location information, existing between the departure place and the destination of the mobility 1, is associated with the user attribute information. The predetermined place includes a road through which the mobility 1 passes. The predetermined place also includes a stopover (stop place) where the mobility 1 has stopped before reaching the destination.

The database generation unit 333 includes a link ID database generation unit 351 and an area ID database generation unit 352.

The link ID database generation unit 351 generates a linked ID database in which a link ID (road identification information) for identifying a link (road) specified based on the location information, a date and time of passing through the link (road), and the user attribute information are associated with each other.

The link ID database 323 stores the link ID database generated by the link ID database generation unit 351.

FIG. 8 is a diagram showing an example of the link ID database according to the present embodiment.

As shown in FIG. 8, the link ID database 323 stores the link ID for identifying a link through which the mobility 1 has passed, a passage date and time indicating the date and time when the mobility 1 has passed the link indicated by the link ID, and the reservation ID while associating them with each other. As shown in FIG. 7, the reservation ID is associated with the user ID, and as shown in FIG. 6, the user ID is associated with the user attribute information. Thus, the link ID database 323 stores the link ID, the passage date and time, and the user attribute information while associating them with each other.

When determining that the mobility 1 has passed a new link based on the location information on the mobility 1, the link ID database generation unit 351 generates a record in which a link ID indicating the new link through which the mobility 1 has passed, a passage date and time, and a reservation ID are associated with each other, and adds the record to the link ID database 323.

The link information storage unit 325 stores link information indicating a location of each link on a map.

FIG. 9 is a diagram showing an example of the link information according to the present embodiment.

As shown in FIG. 9, the link information storage unit 325 stores link information in which a link ID, coordinates of end points, and a distance between the end points are associated with each other. The coordinates of end points represent coordinates of two nodes on the map that are the two end points of the link. With reference to the link information, a location on the map corresponding to the link ID in the link ID database 323 is specified.

The area ID database generation unit 352 determines whether the mobility 1 has stopped at a stopover (stop place) before reaching the destination. When determining that the mobility 1 has stopped at the stopover (stop place) before reaching the destination, the area ID database generation unit 352 generates an area ID database in which the stop place identification information for identifying the stopover (stop place) where the mobility 1 has stopped, the date and time of the stop at the stopover (stop place), and the user attribute information are associated with each other. The stop place identification information includes the area ID (area identification information) for identifying an area including the stopover (stop place) among a plurality of areas obtained by dividing the map information.

In the present embodiment, the area ID database generation unit 352 determines whether the mobility 1 has stopped for a predetermined time or more based on the location information to determine whether the mobility 1 has stopped at the stopover (stop place) before reaching the destination. When determining that the mobility 1 has stopped for the predetermined time or more, the area ID database generation unit 352 generates an area ID database in which the stop place identification information for identifying the stopover (stop place) where the mobility 1 has stopped, the date and time of the stop at the stopover (stop place), and the user attribute information are associated with each other.

The area ID database generation unit 352 may determine whether the mobility 1 has been locked before reaching the destination to determine whether the mobility 1 has stopped at the stopover (stop place) before reaching the destination. In this case, when determining that the mobility 1 has been locked before reaching the destination, the area ID database generation unit 352 may generate an area ID database in which the stop place identification information for identifying the stopover (stop place) where the mobility 1 has stopped, the date and time of the stop at the stopover (stop place), and the user attribute information are associated with each other.

The area ID database generation unit 352 also may determine whether power-off operation or engine stop operation has been performed on the mobility 1 before the mobility 1 reaches the destination to determine whether the mobility 1 has stopped at the stopover (stop place) before reaching the destination. In this case, when determining that the power-off operation or the engine stop operation has been performed on the mobility 1 before the mobility 1 reaches the destination, the area ID database generation unit 352 may generate an area ID database in which the stop place identification information for identifying the stopover (stop place) where the mobility 1 has stopped, the date and time of the stop at the stopover (stop place), and the user attribute information are associated with each other.

Figure 10:
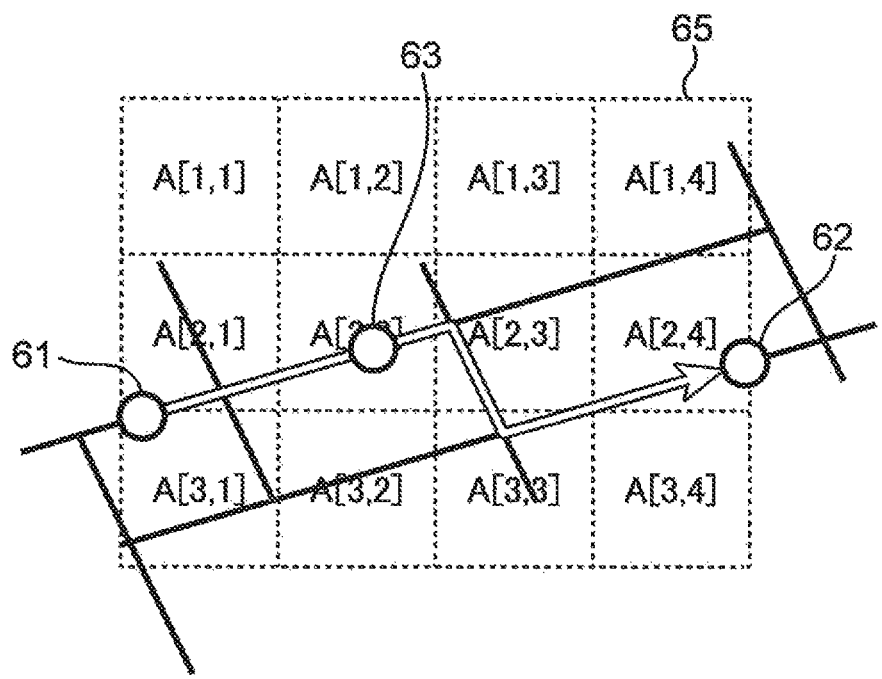
FIG. 10 is a diagram for illustrating an area group obtained by dividing map information into a plurality of areas in the present embodiment.

FIG. 10 is a diagram for illustrating an area group obtained by dividing the map information into the plurality of areas in the present embodiment.

As shown in FIG. 10, an area group 65 includes a plurality of rectangular areas into which the map information is divided. Each of the plurality of areas has the same size. Each area has a vertical length and a horizontal length that are each 30 meters, for example. Each area is assigned with the area ID for identifying the area. FIG. 10 indicates "A [1,1]", "A [1,2]", and the like that are each an area ID. The area ID database generation unit 352 specifies an area ID of an area including a stopover (stop place) where the mobility 1 has stopped for a predetermined time or more based on the location information. For example, the stopover 63 exists in an area with the area ID of "A [2, 2]".

In the present embodiment, the map information is divided into a plurality of rectangular areas. However, the present disclosure is not particularly limited thereto, and the map information may be divided into a plurality of circular areas.

The area ID database generation unit 352 may specify the area ID of an area including a stopover (stop place) where the mobility 1 has stopped for a predetermined time or more by using a first area group obtained by dividing the map information into a plurality of rectangular areas, and a second area group obtained by dividing the map information into a plurality of rectangular areas that is disposed at locations different from those of the first area group. The area ID of the area in the first area group where the stopover exists and the area ID of the area in the second area group where the stopover exists are stored in the area ID database 324.

Figure 11:
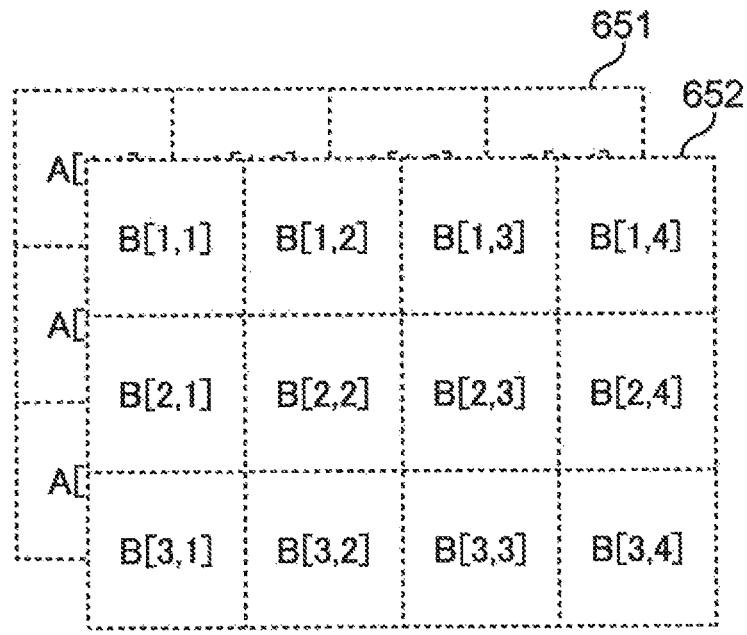
FIG. 11 is a diagram for illustrating a first area group and a second area group each of which is obtained by dividing map information into a plurality of rectangular areas in the present embodiment.

FIG. 11 is a diagram for illustrating the first area group and the second area group each of which is obtained by dividing map information into a plurality of rectangular areas in the present embodiment.

As shown in FIG. 11, a first area group 651 is obtained by dividing the map information into a plurality of rectangular areas, and a second area group 652 is obtained by dividing the map information into a plurality of rectangular areas. The second area group 652 is displaced vertically and horizontally from the first area group 651. The area ID database generation unit 352 specifies the area ID of an area including a stopover (stop place) where the mobility 1 has stopped for a predetermined time or more, selected from the first area group 651, and specifies the area ID of an area including a stopover (stop place) where the mobility 1 has stopped for a predetermined time or more, selected from the second area group 652. When the stopover overlaps with an area in the first area group 651 and an area in the second area group 652, both the area ID of the area where the stopover exists in the first area group 651 and the area ID of the area where the stopover exists in the second area group 652 are stored in the area ID database 324.

As described above, the area ID database generation unit 352 specifies the area where the stopover exists, using the first area group 651 and the second area group 652 disposed allowing the areas in the first area group 651 to be displaced from the areas in the second area group 652, so that the number of counts of the stopover can be prevented from differing between places at an end of an area and at the center thereof.

Figure 12:
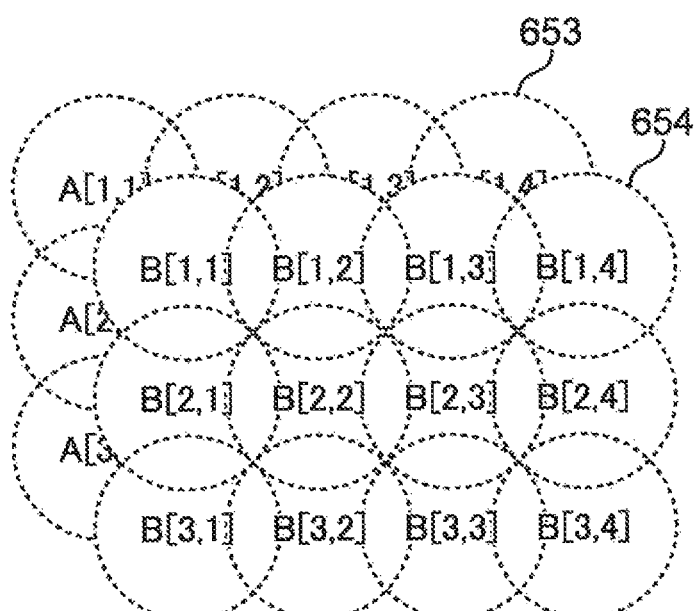
FIG. 12 is a diagram for illustrating a first area group and a second area group each of which is obtained by dividing map information into a plurality of circular areas in the present embodiment.

FIG. 12 is a diagram for illustrating the first area group and the second area group each of which is obtained by dividing map information into a plurality of circular areas in the present embodiment.

As shown in FIG. 12, a first area group 653 is obtained by dividing the map information into a plurality of circular areas, and a second area group 654 is obtained by dividing the map information into a plurality of circular areas. The second area group 654 is displaced vertically and horizontally from the first area group 653. The area ID database generation unit 352 specifies the area ID of an area including a stopover (stop place) where the mobility 1 has stopped for a predetermined time or more, selected from the first area group 653, and specifies the area ID of an area including a stopover (stop place) where the mobility 1 has stopped for a predetermined time or more, selected from the second area group 654. When the stopover overlaps with an area in the first area group 653 and an area in the second area group 654, both the area ID of the area where the stopover exists in the first area group 653 and the area ID of the area where the stopover exists in the second area group 654 are stored in the area ID database 324.

The area ID database 324 stores the area ID database generated by the area ID database generation unit 352.

FIG. 13 is a diagram showing an example of the area ID database according to the present embodiment.

As shown in FIG. 13, the area ID database 324 stores an area ID for identifying an area where the mobility 1 has stopped, a stop date and time indicating a date and time when the mobility 1 has stopped at the area indicated by the area ID, and a reservation ID while associating them with each other. As shown in FIG. 7, the reservation ID is associated with the user ID, and as shown in FIG. 6, the user ID is associated with the user attribute information. Thus, the area ID database 324 stores the area ID, the stop date and time, and the user attribute information while associating them with each other.

When the location information on the mobility 1 indicates that the mobility 1 has stopped for a predetermined time or more, the area ID database generation unit 352 generates a record in which the area ID of an area including the stopover, the stop date and time, and the reservation ID are associated with each other, and adds the record to the area ID database 324.

The area information storage unit 326 stores area information indicating a location of each area on the map.

Figure 14:
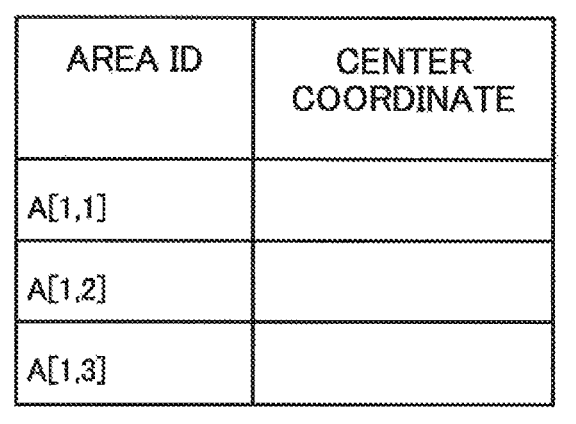

FIG. 14 is a diagram showing an example of the area information according to the present embodiment.

As shown in FIG. 14, the area information storage unit 326 stores the area information in which an area ID is associated with the center coordinates of an area. The center coordinates represent the center coordinates of each of the plurality of divided areas on the map. With reference to the area information, a location on the map corresponding to the area ID in the area ID database 324 is specified.

The map information storage unit 327 preliminarily stores the map information.

The reservation information acquisition unit 334 acquires reservation information including a departure place and a destination inputted by the user. The reservation information acquisition unit 334 acquires the reservation information corresponding to the latest reservation ID from the reservation information storage unit 322.

The traveling route prediction unit 335 predicts a traveling route from the departure place to the destination. The traveling route prediction unit 335 predicts the traveling route using a best-first search algorithm. The best-first search algorithm is, for example, Dijkstra's algorithm, A* search algorithm, or uniform cost search. The traveling route prediction unit 335 may specify a use time zone in which the user uses the mobility 1 from a reservation start date and time, and a reservation end date and time, included in the reservation information, and may specify a gender, an age, and an occupation of the user who has made a reservation from the user ID included in the reservation information.

Then, from the link ID database 323, the traveling route prediction unit 335 may extract a link ID of a link through which the user passes through in the specified use time zone, the user having the same gender, age and occupation as the specified gender, age, and occupation, the link being selected from among links between the departure place and the destination. The traveling route prediction unit 335 may convert the extracted link ID into a traveling cost, and predict a traveling route using the traveling cost in the best-first search algorithm.

The stopover extraction unit 336 extracts a stopover (stop place) existing near the traveling route from the area ID database 324. That is, the stopover extraction unit 336 extracts area IDs of all areas through which the traveling route passes from among the plurality of area IDs stored in the area ID database 324.

The probability calculation unit 337 calculates the first probability of stopping at the stopover (stop place) when an advertisement for promoting the extracted stopover (stop place) is not distributed, and the second probability of stopping at the stopover (stop place) when the advertisement is distributed. The area IDs extracted from the area ID database 324 are each associated with a reservation ID, and the reservation ID corresponds to reservation information including an advertisement ID. The advertisement ID is information for identifying the distributed advertisement. When the advertisement is distributed, the advertisement ID of the distributed advertisement is stored in a field of the advertisement ID, and when the advertisement is not distributed, the advertisement ID is not stored in the field of the advertisement ID. Thus, presence or absence of the advertisement ID enables determining whether the advertisement has been distributed.

The difference value calculation unit 338 calculates a difference value between the first probability and the second probability calculated by the probability calculation unit 337.

The advertisement information generation unit 339 generates advertisement information based on the difference value calculated by the difference value calculation unit 338. The advertisement information generation unit 339 generates the advertisement information on a stopover (stop place) having a maximum difference value among a plurality of stopovers (stop places). The communication unit 31 transmits the advertisement information generated by the advertisement information generation unit 339 to the terminal device 2.

The collection target extraction unit 340 acquires the extraction condition received by the communication unit 31. The collection target extraction unit 340 extracts a predetermined place satisfying the extraction condition from the link ID database 323 or the area ID database 324.

The predetermined place includes a link (road) through which the mobility 1 has passed. The extraction condition includes; an occupation, an age, and a gender included in the user attribute information, being selected from all types of occupation, all types of age, and all types of gender; the date and time of passing through the link (road) that is within a specific time zone; and a type of the mobility 1 that is a specific type. The collection target extraction unit 340 extracts a plurality of links (roads) satisfying the extraction condition from the link ID database 323.

The predetermined place also includes a stopover (stop place) where the mobility 1 has stopped for a predetermined time or more. The extraction condition includes the occupation included in the user attribute information that is a specific occupation, the date and time of stopping at the stopover (stop place) that is within the specific time zone, and the type of mobility 1 that is the specific type. The collection target extraction unit 340 extracts a plurality of stopovers (stop places) satisfying the extraction condition from the area ID database 324.

The analysis result generation unit 341 outputs analysis result information including the predetermined place extracted by the collection target extraction unit 340 to the communication unit 31. The analysis result generation unit 341 totals the number of passes for each of the plurality of links (roads) extracted by the collection target extraction unit 340, and outputs the analysis result information including a predetermined number of links (roads) in order from a link (road) with a maximum total number to the communication unit 31. The analysis result generation unit 341 also totals the number of stops for each of the plurality of stopovers (stop places) extracted by collection target extraction unit 340, and outputs the analysis result information including a predetermined number of stopovers (stop places) in order from a stopover (stop place) with a maximum total number to the communication unit 31.

When the communication unit 31 receives the reservation information, the password issuing unit 342 issues a password for unlocking the electronic lock 16 of the mobility 1. The password issuing unit 342 stores the issued password in the reservation information storage unit 322 while associating the issued password with the reservation ID.

The unlock control unit 343 determines whether to unlock the electronic lock 16 of the mobility 1 based on the password and the mobility ID received by the communication unit 31. The unlock control unit 343 refers to the reservation information stored in the reservation information storage unit 322, and determines to unlock the electronic lock 16 of the mobility 1 when the password associated with the mobility ID received by the communication unit 31 is the same as the password received by the communication unit 31. On the other hand, the unlock control unit 343 refers to the reservation information stored in the reservation information storage unit 322, and determines not to unlock the electronic lock 16 of the mobility 1 when the password associated with the mobility ID received by the communication unit 31 is not the same as the password received by the communication unit 31. When determining to unlock the electronic lock 16 of the mobility 1, the unlock control unit 343 outputs an unlock signal to the communication unit 31.

When the communication unit 31 receives a return signal, the return control unit 344 deletes the password associated with the mobility ID included in the return signal from the reservation information stored in the reservation information storage unit 322. The return control unit 344 also may transmit an e-mail, notifying completion of return, to the terminal device 2 via the communication unit 31.

Subsequently, database generation operation of the server device 3 according to an embodiment of the present disclosure will be described.

Figure 15:
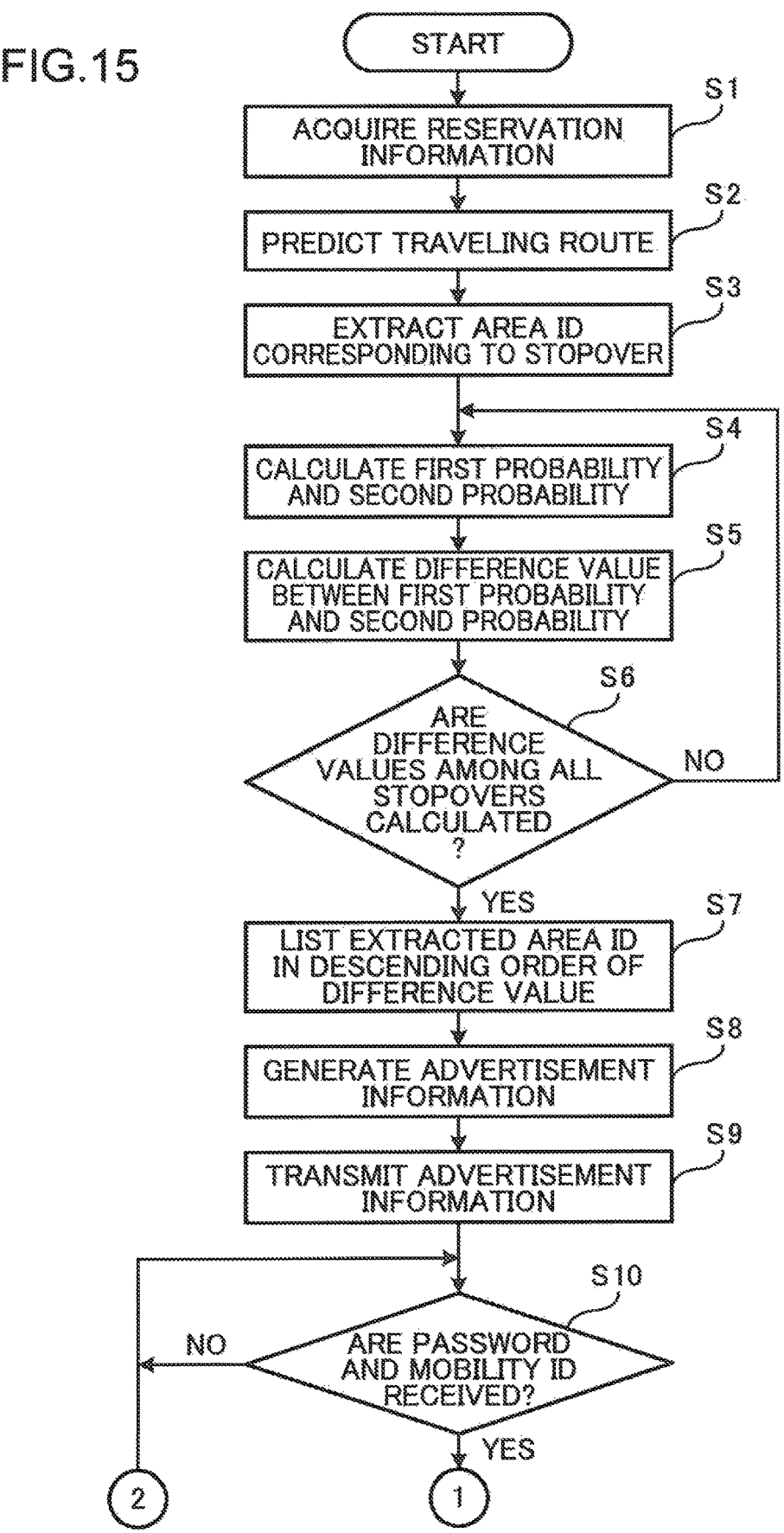
FIG. 15 is a first flowchart for illustrating database generation operation of a server device according to an embodiment of the present disclosure.
Figure 16:
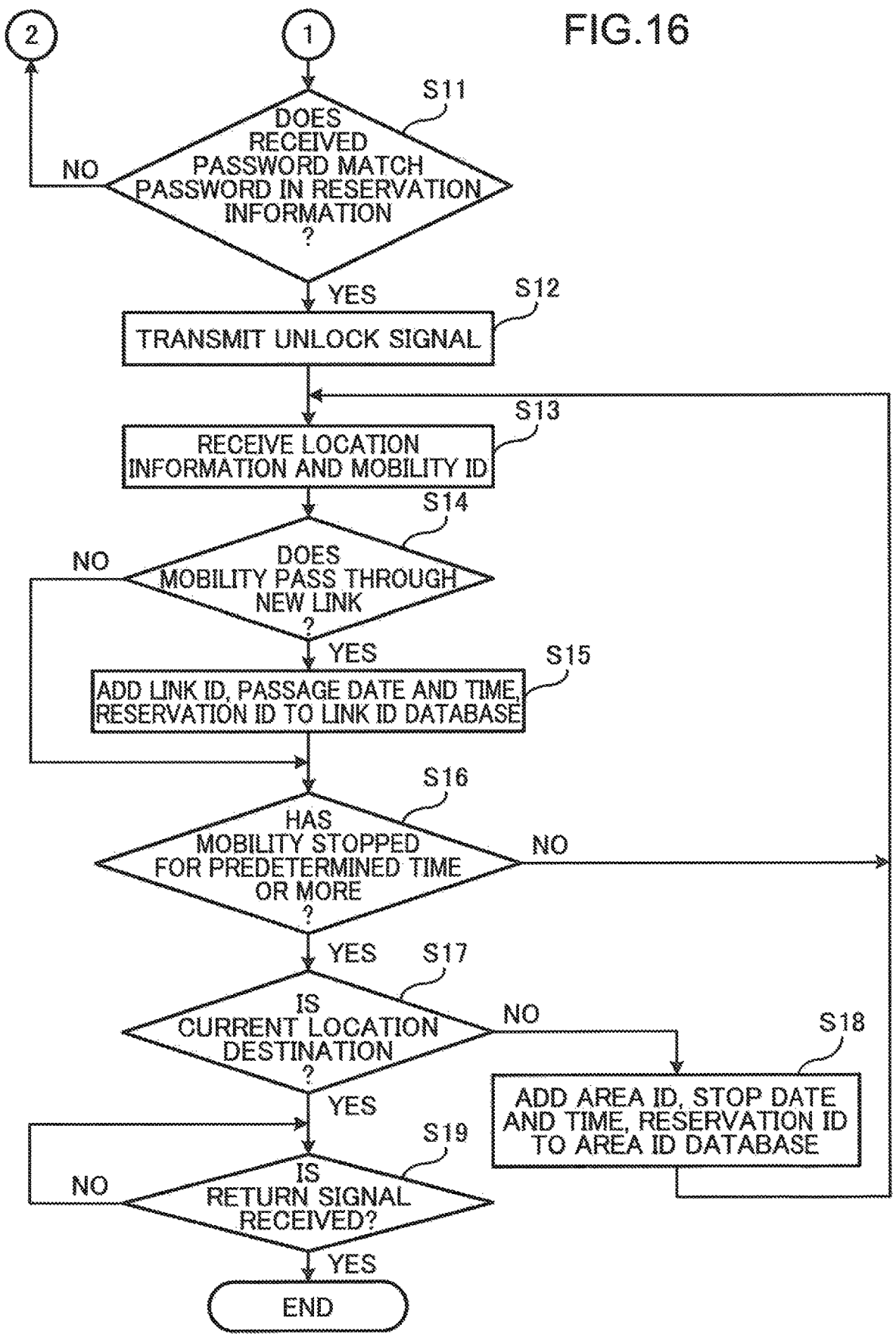
FIG. 16 is a second flowchart for illustrating the database generation operation of the server device according to the embodiment of the present disclosure.

FIG. 15 is a first flowchart for illustrating the database generation operation of a server device according to the embodiment of the present disclosure, and FIG. 16 is a second flowchart for illustrating the database generation operation of the server device according to the embodiment of the present disclosure.

First, in step S1, the reservation information acquisition unit 334 acquires the reservation information corresponding to the latest reservation ID from the reservation information storage unit 322.

Next, in step S2, the traveling route prediction unit 335 predicts a traveling route from the departure place to the destination using the best priority search algorithm.

Subsequently, in step S3, the stopover extraction unit 336 extracts, from the area ID database 324, an area ID corresponding to a stopover existing near the traveling route predicted by the traveling route prediction unit 335. At this time, the stopover extraction unit 336 extracts area IDs of all areas through which the traveling route passes from among the plurality of area IDs stored in the area ID database 324.

Next, in step S4, the probability calculation unit 337 calculates the first probability of stopping in areas with the extracted area IDs when an advertisement for promoting a stopover in the areas is not distributed, and the second probability of stopping in the areas when the advertisement is distributed.

FIG. 17 is a diagram showing an example of the first probability of stopping in an area of an extracted area ID when an advertisement for promoting a stopover in the area is not distributed in the present embodiment, and FIG. 18 is a diagram showing an example of the second probability of stopping in the area of the extracted area ID when the advertisement for promoting the stopover in the area is distributed in the present embodiment.

The examples shown in FIGS. 17 and 18 each show three area IDs in descending order of probability selected from among the plurality of area IDs extracted as stopovers.

As shown in FIG. 17, when an advertisement of a stopover included in an area ID "A[1,3]" is not distributed, the mobility 1 has a first probability of 20% of stopping at the stopover included in the area ID "A[1,3]". When an advertisement of a stopover included in an area ID "A[2,3]" is not distributed, the mobility 1 has a first probability of 15% of stopping at the stopover included in the area ID "A[2,3]". When an advertisement of a stopover included in an area ID "A[4,3]" is not distributed, the mobility 1 has a first probability of 10% of stopping at the stopover included in the area ID "A[4,3]".

As shown in FIG. 18, when the advertisement of the stopover included in the area ID "A[1,3]" is distributed, the mobility 1 has a second probability of 25% of stopping at the stopover included in the area ID "A[1,3]". When the advertisement of the stopover included in the area ID "A[2,3]" is distributed, the mobility 1 has a second probability of 30% of stopping at the stopover included in the area ID "A[2,3]". When the advertisement of the stopover included in the area ID "A[4,3]" is distributed, the mobility 1 has a second probability of 20% of stopping at the stopover included in the area ID "A[4,3]".

Returning to FIG. 15, next, in step S5, the difference value calculation unit 338 calculates a difference value between the first probability and the second probability calculated by the probability calculation unit 337.

Subsequently, in step S6, the difference value calculation unit 338 determines whether difference values among area IDs corresponding to all the extracted stopovers have been calculated. Here, when it is determined that the difference values among the area IDs corresponding to all the extracted stopovers have not been calculated (NO in step S6), processing returns to step S4.

On the other hand, when it is determined that the difference values among the area IDs corresponding to all of the extracted stopovers have been calculated (YES in step S6), in step S7, the difference value calculation unit 338 lists area IDs corresponding to the extracted stopovers in descending order of the difference value.

FIG. 19 is a diagram showing an example of the difference value between the first probability and the second probability in the present embodiment.

The example shown in FIG. 19 shows three area IDs in descending order of the difference value obtained by subtracting the first probability from the second probability, selected from among the plurality of area IDs extracted as stopovers.

As shown in FIG. 19, the area ID "A[2,3]" has a difference value of 15%, the area ID "A[4,3]" has a difference value of 10%, and the area ID "A[1,3]" has a difference value of 5%. It can be said that advertising effect increases as the difference value increases.

As described above, the difference value between the first probability of stopping at the stopover when the advertisement is not distributed and the second probability of stopping at the stopover when the advertisement is distributed shows how many people stop at the stopover by distributing the advertisement. This enables transmitting an advertisement of a stopover where an advertising effect increases more.

The server device 3 may determine an advertisement fee in accordance with the difference value. For example, the server device 3 may increase the advertisement fee as the difference value increases.

Returning to FIG. 15, next, in step S8, the advertisement information generation unit 339 generates advertisement information including an advertisement of a stopover included in an area ID with a maximum difference value, an advertisement of a stopover included in an area ID with a second maximum difference value, and an advertisement of a stopover included in an area ID with a third maximum difference value. While in the present embodiment, the advertisement information generation unit 339 generates one type of advertisement information including three advertisements, the present disclosure is not particularly limited to thereto, and three types of advertisement information including three respective advertisements may be generated.

Next, in step S9, the communication unit 31 transmits the advertisement information generated by the advertisement information generation unit 339 to the terminal device 2. The communication unit 24 of the terminal device 2 receives the advertisement information transmitted by the server device 3. The display unit 23 displays the advertisement information received by the communication unit 24.

In this way, the advertisement information is presented to the user at the time of a reservation or during a period after the reservation and before boarding the mobility 1.

Next, in step S10, the unlock control unit 343 determines whether the communication unit 31 receives a password and a mobility ID. Here, when it is determined that the password and the mobility ID are not received (NO in step S10), the processing of step S10 is performed until the password and the mobility ID are received.

On the other hand, when it is determined that the password and the mobility ID are received (YES in step S10), in step S11, the unlock control unit 343 determines whether the password received by the communication unit 31 matches a password included in the reservation information stored in the reservation information storage unit 322 while being associated with the mobility ID received by the communication unit 31. Here, when it is determined that the received password does not match the password in the reservation information (NO in step S11), the processing returns to step S10.

When it is determined that the received password does not match the password in the reservation information, the unlock control unit 343 may transmit information indicating that the password is incorrect to the mobility 1 or the terminal device 2.

On the other hand, when it is determined that the received password matches the password in the reservation information (YES in step S11), in step S12, the unlock control unit 343 transmits an unlock signal to the mobility 1 via the communication unit 31. The communication unit 14 of the mobility 1 receives the unlock signal transmitted by the server device 3. The unlocking unit 121 of the mobility 1 unlocks the electronic lock 16 when receiving the unlock signal.

Next, in step S13, the communication unit 31 receives the location information and the mobility ID transmitted by the mobility 1. The communication unit 14 of the mobility 1 periodically transmits the location information received by the GPS receiving unit 13 to the server device 3 together with the mobility ID.

The communication unit 14 of the mobility 1 may periodically transmit the location information indicating a current location of the mobility 1 to the server device 3 not only during unlocking but also during locking. In addition, the communication unit 14 may periodically transmit the location information indicating a current location of the mobility 1 to the server device 3 only during unlocking.

Next, in step S14, the link ID database generation unit 351 specifies a link where the mobility 1 currently exists based on the location information indicating the current location of the mobility 1, and determines whether the mobility 1 passes through a new link. The link ID database generation unit 351 calculates, for example, a moving average in location of the mobility 1 per minute, and specifies a link closest to the calculated moving average in location thereof as a link that the mobility 1 currently passes.

Here, when it is determined that the mobility 1 does not pass through the new link (NO in step S14), the processing proceeds to step S16.

On the other hand, when it is determined that the mobility 1 passes through the new link (YES in step S14), in step S15, the link ID database generation unit 351 adds a link ID of the new link, a passage date and time of the link, and a reservation ID to the link ID database 323. The passage date and time is the date and time when the mobility 1 reaches the new link. Thus, every time the mobility 1 reaches a new link, a link ID, a passage date and time, and a reservation ID are added to the link ID database 323.

Next, in step S16, the area ID database generation unit 352 determines whether the mobility 1 has stopped for a predetermined time or more based on the location information. The predetermined time is, for example, 10 minutes. Here, when it is determined that the mobility 1 has not stopped for a predetermined time or more (NO in step S16), the processing returns to step S13.

The mobility 1 may transmit a lock signal indicating that the mobility 1 is locked to the server device 3. In this case, the area ID database generation unit 352 may measure the elapsed time after receiving the lock signal and determine whether the measured elapsed time is equal to or more than a predetermined time. Then, when the elapsed time after receiving the lock signal is equal to or more than the predetermined time, the area ID database generation unit 352 determines that the mobility 1 has stopped for the predetermined time or more.

On the other hand, when it is determined that the mobility 1 has stopped for the predetermined time or more (YES in step S16), in step S17, the area ID database generation unit 352 determines whether the current location is the destination based on the location information. When it is determined that the current location is not the destination (NO in step S17), in step S18, the area ID database generation unit 352 adds an area ID of an area including the current location of the mobility 1, a stop date and time, and a reservation ID to the area ID database 324.

When it is determined that the current location is the destination (YES in step S17), in step S19, the return control unit 344 determines whether the communication unit 31 has received the return signal. When it is determined that the return signal has not been received (NO in step S19), the processing of step S19 is performed until the return signal is received. On the other hand, when it is determined that the return signal has been received (YES in step S19), the processing ends. At this time, the return control unit 344 deletes the password associated with the reservation ID from the reservation information.

As described above, the database (the link ID database 323 or the area ID database 324) is generated in which the predetermined place existing between the departure place and the destination of the mobility 1, the predetermined place being specified based on the location information indicating a location of the mobility 1 traveling from the departure place to the destination in response to an instruction of the user, is associated with the user attribute information indicating the attributes of the user boarding the mobility 1. This enables collecting a usage status of the mobility 1 movable along an arbitrary route from the departure place to the destination in more detail and with high accuracy.

Subsequently, data analysis operation of the server device 3 according to an embodiment of the present disclosure will be described.

Figure 20:
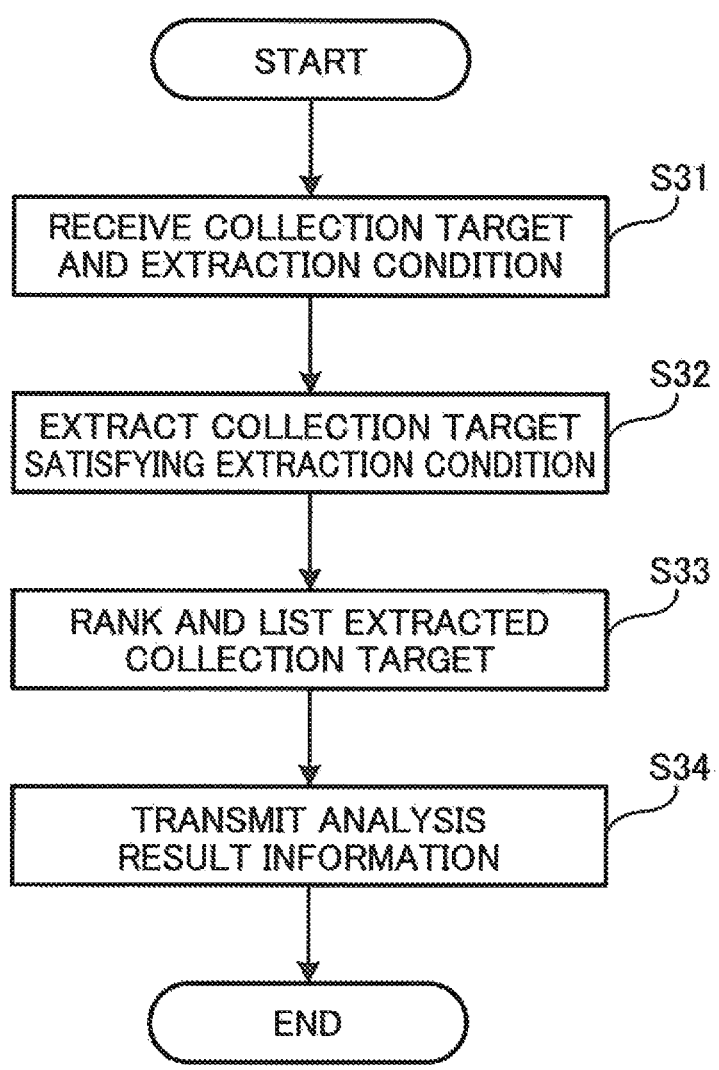
FIG. 20 is a flowchart for illustrating data analysis operation of a server device according to an embodiment of the present disclosure.

FIG. 20 is a flowchart for illustrating the data analysis operation of the server device according to the embodiment of the present disclosure.

First, in step S31, the communication unit 31 receives collection targets and an extraction condition from the information processor 4. The information processor 4 receives the collection targets and the extraction condition input by an operator, and transmits the input collection targets and extraction condition to the server device 3.

Examples of the collection target include, for example, a departure place, a destination, a stopover, and a passage amount for each link or a passage amount of a link group obtained by connecting a plurality of adjacent links. Examples of the extraction condition include, for example, a user attribute (a gender, an age, or an occupation), a unit of time (a time zone, a day of the week, or a time period), and a type of mobility.

Next, in step S32, the collection target extraction unit 340 extracts collection targets that satisfy the extraction condition received by the communication unit 31 from among the collection targets received by the communication unit 31.

Subsequently, in step S33, the analysis result generation unit 341 ranks and lists the collection targets extracted by the collection target extraction unit 340.

FIG. 21 is a diagram showing an example of an analysis result in which destinations extracted based on a predetermined extraction condition are ranked and listed in the present embodiment.

In FIG. 21, the collection target is a destination, and the extraction condition includes the occupation being a student, the time period being one year, and the type of mobility including all types. The collection target extraction unit 340 extracts destinations satisfying the extraction condition from among destinations in the reservation information. The analysis result generation unit 341 lists the extracted destinations in descending order of the number of arrivals. The destinations in the reservation information are each represented by an area ID. Thus, the collection target extraction unit 340 may specify a facility included in an area indicated by an area ID from the map information, and may specify the specified facility as a destination. For example, when the facility existing in the area with the area ID "A[1,3]" is "ZZZ University", "ZZZ University" is specified as the destination. When a plurality of facilities exist in the area, the plurality of facilities each may be specified as the destination.

In this way, when destinations used by students are listed in descending order of the number of students, a place where a bus stop is to be installed can be specified, for example.

FIG. 22 is a diagram showing an example of an analysis result in which link passage amounts extracted based on a predetermined extraction condition are ranked and listed in the present embodiment.

In FIG. 22, the collection target is a link passage amount, and the extraction condition includes a user attribute selected from all types of attribute, a time period of one year, and types of mobility being an electric motorcycle and an electric vehicle. The collection target extraction unit 340 extracts link IDs satisfying the extraction condition from the link ID database 323. The analysis result generation unit 341 lists the extracted link IDs in descending order of the number of passes. The passage amount of each link ID may be converted into a passage amount per day.

In this way, when links through which people of all types of attribute using the electric motorcycle and the electric vehicle pass are listed in descending order of the number of passes, a place where a charging station is to be installed can be specified, for example.

FIG. 23 is a diagram showing an example of an analysis result in which stopovers extracted based on a predetermined extraction condition are ranked and listed in the present embodiment.

In FIG. 23, the collection target is a stopover, and the extraction condition includes the occupation being a student, the time period being one year, the time zone being from 11:30 to 13:30, and the types of mobility being an electric motorcycle and an electric vehicle. The collection target extraction unit 340 extracts area IDs satisfying the extraction condition from the area ID database 324. The analysis result generation unit 341 lists the extracted area IDs in descending order of the number of stops. The collection target extraction unit 340 may specify a facility included in the area indicated by the area ID from the map information, and may specify the specified facility as a stopover. For example, when the facility existing in the area with the area ID "A[1,3]" is "restaurant AAA", "restaurant AAA" is specified as the stopover. When a plurality of facilities exist in the area, the plurality of facilities may be each specified as the stopover.

In this way, when stopovers where students each using an electric motorcycle and an electric vehicle stop in between 11:30 and 13:30 are listed in descending order of the number of stops, a place where a store that provides lunch is to be installed can be specified, for example.

Returning to FIG. 20, next, in step S34, the communication unit 31 transmits analysis result information including collection targets ranked and listed to the information processor 4. The information processor 4 receives the analysis result information transmitted by the server device 3. Then, the information processor 4 causes the received analysis result information to be displayed. This enables the information processor 4 to present the analysis result information to the operator.

As described above, a predetermined place satisfying the extraction condition is extracted from the database (the link ID database 323 or the area ID database 324) in which a predetermined place existing between a departure place and a destination of the mobility 1 is associated with user attribute information indicating attributes of the user boarding the mobility 1, and the analysis result information including the extracted predetermined place is output. Thus, when the operator inputs a desired extraction condition, a predetermined place satisfying the desired extraction condition is obtained. This enables the database (the link ID database 323 or the area ID database 324) to be used for data analysis.

In the present embodiment, when the collection target is a passage amount of a link group, a distance of links of the link group, a unit of time, a user attribute, and a type of mobility are each input as an extraction condition. In this case, the collection target extraction unit 340 may extract, from respective rows of the link ID database 323, links each existing between the departure place and the destination while satisfying the extraction conditions and having the same reservation ID to form a link group satisfying the distance in the extraction conditions by connecting the links to each other. At this time, the link group is represented by link IDs listed in the order of passage. Then, the analysis result generation unit 341 may rank and list the number (the passage amount) of link groups extracted by the collection target extraction unit 340. The collection target extraction unit 340 also may extract, from respective rows of the link ID database 323, links each existing between the departure place and the destination while satisfying the extraction conditions and having the same reservation ID to form a link group having a distance more than that in the extraction conditions by connecting the links to each other.

In each of the above embodiments, each component may be composed of dedicated hardware, or may be realized by executing a software program suitable for each component. Each component may be realized by a program execution unit such as a CPU or a processor reading and executing a software program recorded on a recording medium such as a hard disk or a semiconductor memory.

Some or all of functions of the devices according to the embodiments of the present disclosure are typically realized using a large scale integration (LSI) that is an integrated circuit. The functions may be individually integrated into one chip, or may be integrated into one chip including some or all of the functions. The integrated circuit is not limited to the LSI, and may be realized by a dedicated circuit or a general-purpose processor. A field programmable gate array (FPGA) that can be programmed after manufacturing an LSI, or a reconfigurable processor that can reconfigure connection and setting of circuit cells inside an LSI, may be used.

In addition, some or all of functions of the devices according to the embodiments of the present disclosure may be realized by a processor such as a CPU executing a program.

The numbers used above are merely examples for specifically describing the present disclosure, and the present disclosure is not limited to the illustrated numbers.

The order in which the steps shown in the above flowcharts are performed is merely an example for specifically describing the present disclosure, and any order other than the above may be available as long as a similar effect can be obtained. Some of the above steps may be performed simultaneously (in parallel) with another step.

The technique according to the present disclosure enables collecting a usage status of mobility movable in an arbitrary route from a departure place to a destination in more detail and with high accuracy, and thus is useful for a technique for generating a database.

This application is based on Japanese Patent application No. 2019-137962 filed in Japan Patent Office on Jul. 26, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A database generation method used in a database generation device that generates a database, the database generation method comprising:
   acquiring user attribute information indicating attributes of a user boarding a mobility that travels from a departure place to a destination in response to an instruction of the user;
   acquiring location information indicating a location of the mobility during traveling; and
   generating a database in which a predetermined place existing between the departure place and the destination of the mobility is associated with the user attribute information,
   wherein the predetermined place is specified based on the location information,
   wherein the predetermined place includes a stop place where the mobility stops before reaching the destination, and
   the database includes stop place identification information for identifying the stop place at which the mobility has stopped, a date and time at which the mobility has stopped at the stop place, and the user attribute information, the stop place identification information, the date and time, and the user attribute information being associated with each other, when it is determined whether the mobility has stopped at the stop place before reaching the destination and it is determined that the mobility has stopped at the stop place before reaching the destination, and
   wherein the database generation method further includes:
   acquiring reservation information including the departure place and the destination input by the user;
   predicting a traveling route from the departure place to the destination;
   extracting the stop place existing near the traveling route from the database;
   calculating a first probability of stopping at the stop place extracted when an advertisement for promoting the stop place extracted is not distributed, and a second probability of stopping at the stop place when the advertisement is distributed;
   calculating a difference value between the first probability and the second probability; and
   transmitting the advertisement based on the difference value.

2. The database generation method according to claim 1, wherein the predetermined place includes a road through which the mobility passes, and the database includes road identification information for identifying the road specified based on the location information, a date and time of passage through the road, and the user attribute information, the road identification information, the date and time, and the user attribute information being associated with each other.

3. The database generation method according to claim 1, wherein the determination is made as to whether the mobility has stopped at the stop place before reaching the destination based on whether the mobility has stopped for a predetermined time or more based on the location information.

4. The database generation method according to claim 1, wherein the determination is made as to whether the mobility has stopped at the stop place before reaching the destination based on whether the mobility has been locked before reaching the destination.

5. The database generation method according to claim 1, wherein the determination is made as to whether the mobility has stopped at the stop place before reaching the destination based on whether power-off operation or engine stop operation has been performed on the mobility before the mobility reaches the destination.

6. The database generation method according to claim 1, wherein the stop place identification information includes area identification information for identifying an area including the stop place selected from among a plurality of areas obtained by dividing map information.

7. The database generation method according to claim 1, wherein the stop place includes a plurality of the stop places, and an advertisement of a stop place having a maximum difference value among the plurality of stop places is transmitted.

8. A database generation device comprising:
a processor that:
acquires user attribute information indicating attributes of a user boarding a mobility that travels from a departure place to a destination in response to an instruction of the user;
acquires location information indicating a location of the mobility during traveling; and
generates a database in which a predetermined place existing between the departure place and the destination of the mobility is associated with the user attribute information,
wherein the predetermined place is specified based on the location information, and
wherein the predetermined place includes a stop place where the mobility stops before reaching the destination, and
the database includes stop place identification information for identifying the stop place at which the mobility has stopped, a date and time at which the mobility has stopped at the stop place, and the user attribute information, the stop place identification information, the date and time, and the user attribute information being associated with each other, when it is determined whether the mobility has stopped at the stop place before reaching the destination and it is determined that the mobility has stopped at the stop place before reaching the destination, and wherein the processor further:
acquires reservation information including the departure place and the destination input by the user;
predicts a traveling route from the departure place to the destination;
extracts the stop place existing near the traveling route from the database;
calculates a first probability of stopping at the stop place extracted when an advertisement for promoting the stop place extracted is not distributed, and a second probability of stopping at the stop place when the advertisement is distributed;
calculates a difference value between the first probability and the second probability; and
transmits the advertisement based on the difference value.

9. A non-transitory computer-readable recording medium recording a database generation program configured to cause a computer to execute:
acquiring user attribute information indicating attributes of a user boarding a mobility that travels from a departure place to a destination in response to an instruction of the user;
acquiring location information indicating a location of the mobility during traveling; and
generating a database in which a predetermined place existing between the departure place and the destination of the mobility is associated with the user attribute information,
wherein the predetermined place is specified based on the location information, and
wherein the predetermined place includes a stop place where the mobility stops before reaching the destination, and
the database includes stop place identification information for identifying the stop place at which the mobility has stopped, a date and time at which the mobility has stopped at the stop place, and the user attribute information, the stop place identification information, the date and time, and the user attribute information being associated with each other, when it is determined whether the mobility has stopped at the stop place before reaching the destination and it is determined that the mobility has stopped at the stop place before reaching the destination, and
wherein the database generation program further causes the computer to execute the steps of:
acquiring reservation information including the departure place and the destination input by the user;
predicting a traveling route from the departure place to the destination;
extracting the stop place existing near the traveling route from the database;
calculating a first probability of stopping at the stop place extracted when an advertisement for promoting the stop place extracted is not distributed, and a second probability of stopping at the stop place when the advertisement is distributed;
calculating a difference value between the first probability and the second probability; and
transmitting the advertisement based on the difference value.

\* \* \* \* \*